US009577525B2

United States Patent
Biondi et al.

(10) Patent No.: US 9,577,525 B2
(45) Date of Patent: Feb. 21, 2017

(54) ADAPTIVE DEAD TIME CONTROL

(71) Applicant: Maxim Integrated Products, Inc., San Jose, CA (US)

(72) Inventors: Tonio Biondi, Catania (IT); Antonio Magazzu, Messina (IT)

(73) Assignee: Maxim Integrated Products, Inc., San Jose, CA (US)

( * ) Notice: Subject to any disclaimer, the term of this patent is extended or adjusted under 35 U.S.C. 154(b) by 126 days.

(21) Appl. No.: 14/474,956

(22) Filed: Sep. 2, 2014

(65) Prior Publication Data
US 2015/0256074 A1 Sep. 10, 2015

Related U.S. Application Data

(60) Provisional application No. 61/947,575, filed on Mar. 4, 2014.

(51) Int. Cl.
*H02M 3/158* (2006.01)
*H02M 1/38* (2007.01)
*H02M 1/00* (2006.01)
*H02M 3/156* (2006.01)

(52) U.S. Cl.
CPC ............ *H02M 3/158* (2013.01); *H02M 1/38* (2013.01); *H02M 3/1588* (2013.01); *H02M 2001/0051* (2013.01); *H02M 2001/385* (2013.01); *H02M 2003/1566* (2013.01); *Y02B 70/1466* (2013.01); *Y02B 70/1491* (2013.01)

(58) Field of Classification Search
CPC H02M 1/38; H02M 2001/385; Y02B 70/1466
See application file for complete search history.

(56) References Cited

U.S. PATENT DOCUMENTS 5,145,054 A * 9/1992 Nelson .................. B06B 1/0261
198/524
5,986,895 A 11/1999 Stewart et al.
(Continued)

OTHER PUBLICATIONS

Sungwoo Lee; Seungchul Jung; Changbyung Park; Chun-Taek Rim; Gyu-Hyeong Cho, "Accurate Dead-Time Control for Synchronous Buck Converter With Fast Error Sensing Circuits," in Circuits and Systems I: Regular Papers, IEEE Transactions on , vol. 60, No. 11, pp. 3080-3089, Nov. 2013.*

(Continued)

*Primary Examiner* — Harry Behm
*Assistant Examiner* — Peter Novak

(57) ABSTRACT

A dead time detector detects when a dead time occurs in a switching regulator comprising a high-side switch and a low-side switch and generates an output signal based on a duration of the dead time. A first circuit generates a first turn-on signal to turn on the high-side switch and a first turn-off signal to turn off the low-side switch based on the output signal in response to a first edge of a pulse width modulated pulse. A second circuit generates a second turn-on signal to turn on the low-side switch and a second turn-off signal to turn off the high-side switch based on the output signal in response to a second edge of the pulse width modulated pulse. A controller generates drive signals to drive the high-side and low-side switches based on the first and second turn-on and turn-off signals.

25 Claims, 10 Drawing Sheets

(56) References Cited

U.S. PATENT DOCUMENTS

| | | | |
|---|---|---|---|
| 6,002,213 A * | 12/1999 | Wood | H02M 1/08 |
| | | | 315/307 |
| 6,396,250 B1 | 5/2002 | Bridge | |
| 6,614,208 B2 | 9/2003 | Narita | |
| 7,675,281 B1 | 3/2010 | Holt et al. | |
| 7,683,594 B2 | 3/2010 | Kim et al. | |
| 7,868,597 B2 | 1/2011 | Dequina | |
| 7,880,454 B2 | 2/2011 | Latham, II et al. | |
| 7,932,703 B2 * | 4/2011 | Brohlin | H02M 3/158 |
| | | | 323/222 |
| 8,164,320 B2 | 4/2012 | Latham, II et al. | |
| 8,203,321 B2 | 6/2012 | Liang et al. | |
| 8,737,101 B2 | 5/2014 | Cho et al. | |
| 9,306,456 B2 * | 4/2016 | Zhang | H02M 3/158 |
| 2001/0045851 A1 | 11/2001 | Saeki | |
| 2002/0105292 A1 * | 8/2002 | Itoi | H04N 3/16 |
| | | | 315/399 |
| 2002/0163986 A1 | 11/2002 | Harrison | |
| 2004/0017241 A1 | 1/2004 | Saeki | |
| 2004/0189229 A1 * | 9/2004 | Nadd | H02H 7/0838 |
| | | | 318/434 |
| 2004/0189269 A1 | 9/2004 | Lynch | |
| 2005/0057228 A1 | 3/2005 | Shih | |
| 2005/0099830 A1 | 5/2005 | Jung | |
| 2005/0110475 A1 | 5/2005 | Chapuis | |
| 2005/0237120 A1 | 10/2005 | Park | |
| 2007/0132492 A1 | 6/2007 | Chou | |
| 2007/0182390 A1 | 8/2007 | Ishii et al. | |
| 2008/0084197 A1 | 4/2008 | Williams et al. | |
| 2008/0211473 A1 | 9/2008 | Tlasksl et al. | |
| 2008/0298101 A1 | 12/2008 | Kim et al. | |
| 2009/0295350 A1 | 12/2009 | Yamada | |
| 2010/0085118 A1 | 4/2010 | Chiu | |
| 2011/0012577 A1 * | 1/2011 | Wang | H02M 1/38 |
| | | | 323/283 |
| 2011/0241633 A1 | 10/2011 | Herzer et al. | |
| 2012/0019287 A1 | 1/2012 | Brumett, Jr. et al. | |
| 2012/0032657 A1 | 2/2012 | Dequina | |
| 2013/0033248 A1 | 2/2013 | Granger | |
| 2013/0147458 A1 | 6/2013 | Zhak et al. | |

OTHER PUBLICATIONS

Trescases, Oliver; Ng, Wai Tung, "Variable Output, Soft-Switching DC/DC Converter for VLSI Dynamic Voltage Scaling Power Supply Applications," 2004 35th Annual IEEE Power Electronics Specialists Conference, vol. 6, pp. 4149-4155, dated 2004.

* cited by examiner

ADAPTIVE DEAD TIME CONTROL

CROSS-REFERENCE TO RELATED APPLICATIONS

This application claims the benefit of U.S. Provisional Application No. 61/947,575, filed on Mar. 4, 2014. The entire disclosure of the application referenced above is incorporated herein by reference.

FIELD

The present disclosure relates generally to switched-mode power supplies and more particularly to adaptive dead-time control in switched-mode power supplies.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A switched-mode power supply (SMPS) is an electronic power supply that includes a switching regulator to convert electrical power efficiently. Like other power supplies, the SMPS transfers power from a source (e.g., AC mains) to a load (e.g., a personal computer) by converting voltage and current characteristics of the power supplied by the source. Unlike a linear power supply, pass element(s) of the SMPS continually switch between low-dissipation on and off states and are sparingly in high-dissipation transition states, which minimizes waste of energy. Voltage regulation is achieved by varying a ratio of on-to-off time of the pass element(s). In contrast, a linear power supply regulates output voltage by continually dissipating power in a pass element. Higher power conversion efficiency is therefore an important advantage of the SMPS.

SUMMARY

A system comprises a dead time detector, first and second circuits, and a controller. The dead time detector detects when a dead time occurs and that generates an output signal based on a duration of the dead time, where the dead time is a period of time during which a high-side switch and a low-side switch of a switching regulator are turned off. The first circuit generates a first turn-on signal to turn on the high-side switch and a first turn-off signal to turn off the low-side switch based on the output signal in response to a first edge of a pulse width modulated pulse. The second circuit generates a second turn-on signal to turn on the low-side switch and a second turn-off signal to turn off the high-side switch based on the output signal in response to a second edge of the pulse width modulated pulse. The controller generates a first gate drive signal to drive the high-side switch and a second gate drive signal to drive the low-side switch based on the first and second turn-on and turn-off signals.

In other features, the duration of the dead time is a function of the first and second gate drive signals, and the duration of the dead time is independent of a switching frequency of the switching regulator.

In other features, the first and second circuits control the duration of the dead time by respectively advancing timings of the first and second turn-on signals or by delaying timings of the first and second turn-off signals.

In another feature, the dead time detector comprises a comparator that compares a threshold voltage to a voltage at a node where the high-side and low-side switches are connected in series and that generates the output signal including a current pulse based on the comparison.

In other features, the dead time detector comprises a voltage amplifier and a transconductance amplifier. The voltage amplifier generates a differential voltage based on a threshold voltage and a voltage at a node where the high-side and low-side switches are connected in series. The transconductance amplifier generates a positive current pulse as the output signal based on the differential voltage when the dead time occurs.

In another feature, a gain of the voltage amplifier is set according to a desired speed of the dead time detector.

In another feature, the transconductance amplifier outputs a negative current pulse as the output signal in absence of the dead time.

In other features, the first circuit comprises a timer, an integrator, and a differential voltage-to-time converter. The timer generates a pulse having a predetermined pulse width in response to the first edge of the pulse width modulated pulse. The integrator performs a weighted time-integral of the output signal of the dead time detector over a time period equal to the predetermined pulse width and generates an output voltage. The differential voltage-to-time converter compares a reference voltage to the output voltage of the integrator and generates the first turn-on and turn-off signals based on the comparison.

In other features, the second circuit comprises a timer, an integrator, and a differential voltage-to-time converter. The timer generates a pulse having a predetermined pulse width in response to the second edge of the pulse width modulated pulse. The integrator performs a weighted time-integral of the output signal of the dead time detector over a time period equal to the predetermined pulse width and generates an output voltage. The differential voltage-to-time converter compares a reference voltage to the output voltage of the integrator and generates the second turn-on and turn-off signals based on the comparison.

In other features, the system further comprises a first driver and a second driver. The first driver drives the high-side switch based on the first gate drive signal and generates a first feedback signal. The second driver drives the low-side switch based on the second gate drive signal and generates a second feedback signal. The controller receives the first and second feedback signals to prevent the high-side and low-side switches from turning on concurrently. The controller controls the dead time by overriding the first and second feedback signals.

In another feature, the controller comprises a propagation delay control circuit that controls a propagation delay of the switching regulator by turning off the high-side and low-side switches when the pulse width modulated pulse changes state.

In another feature, the propagation delay is a delay between the first edge of the pulse width modulated pulse and a time when a voltage at a node where the high-side and low-side switches are connected in series changes in response to the first edge of the pulse width modulated pulse.

In another feature, the propagation delay is a delay between the second edge of the pulse width modulated pulse and a time when a voltage at a node where the high-side and low-side switches are connected in series changes in response to the second edge of the pulse width modulated pulse.

In still other features, a method comprises detecting when a dead time occurs, where the dead time is a period of time during which a high-side switch and a low-side switch of a switching regulator are turned off, and generating an output signal based on a duration of the dead time. The method further comprises generating a first turn-on signal to turn on the high-side switch and a first turn-off signal to turn off the low-side switch based on the output signal in response to a first edge of a pulse width modulated pulse. The method further comprises generating a second turn-on signal to turn on the low-side switch and a second turn-off signal to turn off the high-side switch based on the output signal in response to a second edge of the pulse width modulated pulse. The method further comprises generating a first gate drive signal to drive the high-side switch and a second gate drive signal to drive the low-side switch based on the first and second turn-on and turn-off signals.

In other features, the duration of the dead time is a function of the first and second gate drive signals, and wherein the duration of the dead time is independent of a switching frequency of the switching regulator.

In other features, the method further comprises controlling the duration of the dead time by respectively advancing timings of the first and second turn-on signals or by delaying timings of the first and second turn-off signals.

In other features, the method further comprises comparing a threshold voltage to a voltage at a node where the high-side and low-side switches are connected in series and generating the output signal including a current pulse based on the comparison.

In other features, the method further comprises generating a differential voltage based on a threshold voltage and a voltage at a node where the high-side and low-side switches are connected in series and outputting current as the output signal based on the differential voltage when the dead time occurs.

In other features, the method further comprises generating a pulse having a predetermined pulse width in response to the first edge of the pulse width modulated pulse. The method further comprises integrating the output signal over a time period equal to the predetermined pulse width and generating an output voltage. The method further comprises comparing a reference voltage to the output voltage and generating the first turn-on and turn-off signals based on the comparison.

In other features, the method further comprises generating a pulse having a predetermined pulse width in response to the second edge of the pulse width modulated pulse. The method further comprises integrating the output signal over a time period equal to the predetermined pulse width and generating an output voltage. The method further comprises comparing a reference voltage to the output voltage and generating the second turn-on and turn-off signals based on the comparison.

In other features, the method further comprises driving the high-side switch based on the first gate drive signal and driving the low-side switch based on the second gate drive signal. The method further comprises generating first and second feedback signals to prevent the high-side and low-side switches from turning on concurrently. The method further comprises controlling the dead time by overriding the first and second feedback signals.

In another feature, the method further comprises controlling a propagation delay of the switching regulator by turning off the high-side and low-side switches when the pulse width modulated pulse changes state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
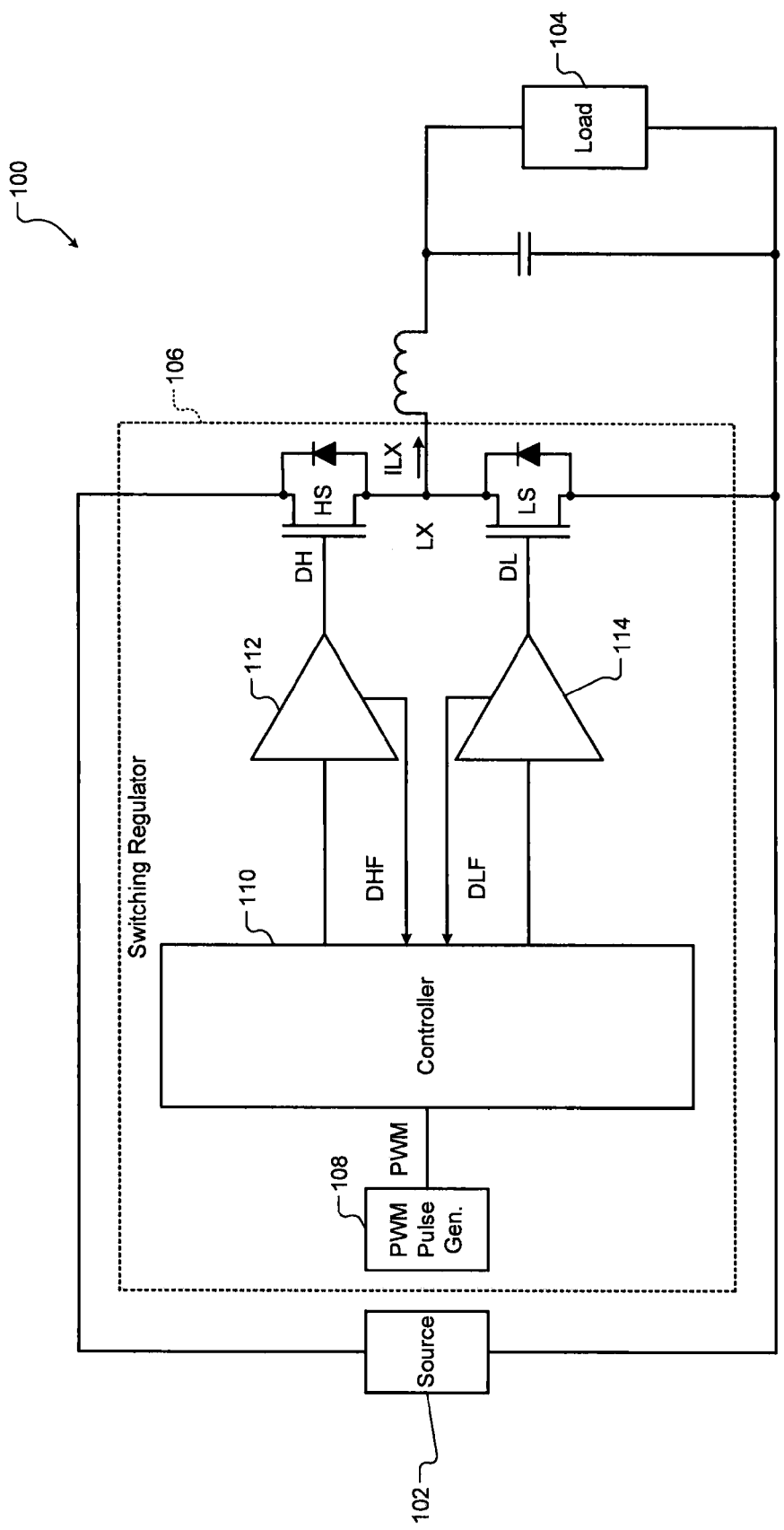
FIG. 1 is a functional block diagram of a switched-mode power supply (SMPS) comprising a switching regulator.

Referring now to FIG. 1, a switched-mode power supply (SMPS) 100 converts an input power received from a power source 102 into an output power and delivers the output power to a load 104. The SMPS 100 comprises a switching regulator 106. The switching regulator 106 comprises a pulse generator 108, a controller 110, a high-side driver 112, a low-side driver 114, a high-side switch, and a low-side switch. The high-side and low-side switches are shown as HS and LS and are also called high-side and low-side pass elements.

The pulse generator 108 uses pulse width modulation (PWM) to generate PWM pulses. The controller 110 generates control signals to drive the high-side and low-side switches based on the PWM pulses. The controller 110 outputs the control signals to the high-side and low-side drivers 112 and 114. The high-side and low-side drivers 112 and 114 generate actual drive signals based on the control signals to respectively drive the high-side and low-side switches.

To ensure proper operation, the pass elements must not be turned on at the same time, which is usually referred to as cross-conduction. Turning on the pass elements at the same time can be detrimental for two reasons. First, a series connection of the pass elements provides a low-impedance path between positive and negative terminals of the power source 102. The low-impedance path can cause large power dissipation and can degrade power conversion efficiency of the SMPS 100. Second, a high current flowing through the series-connected pass elements may damage one or both pass elements and worsen the reliability of the switching regulator 106 over time.

Figure 2:
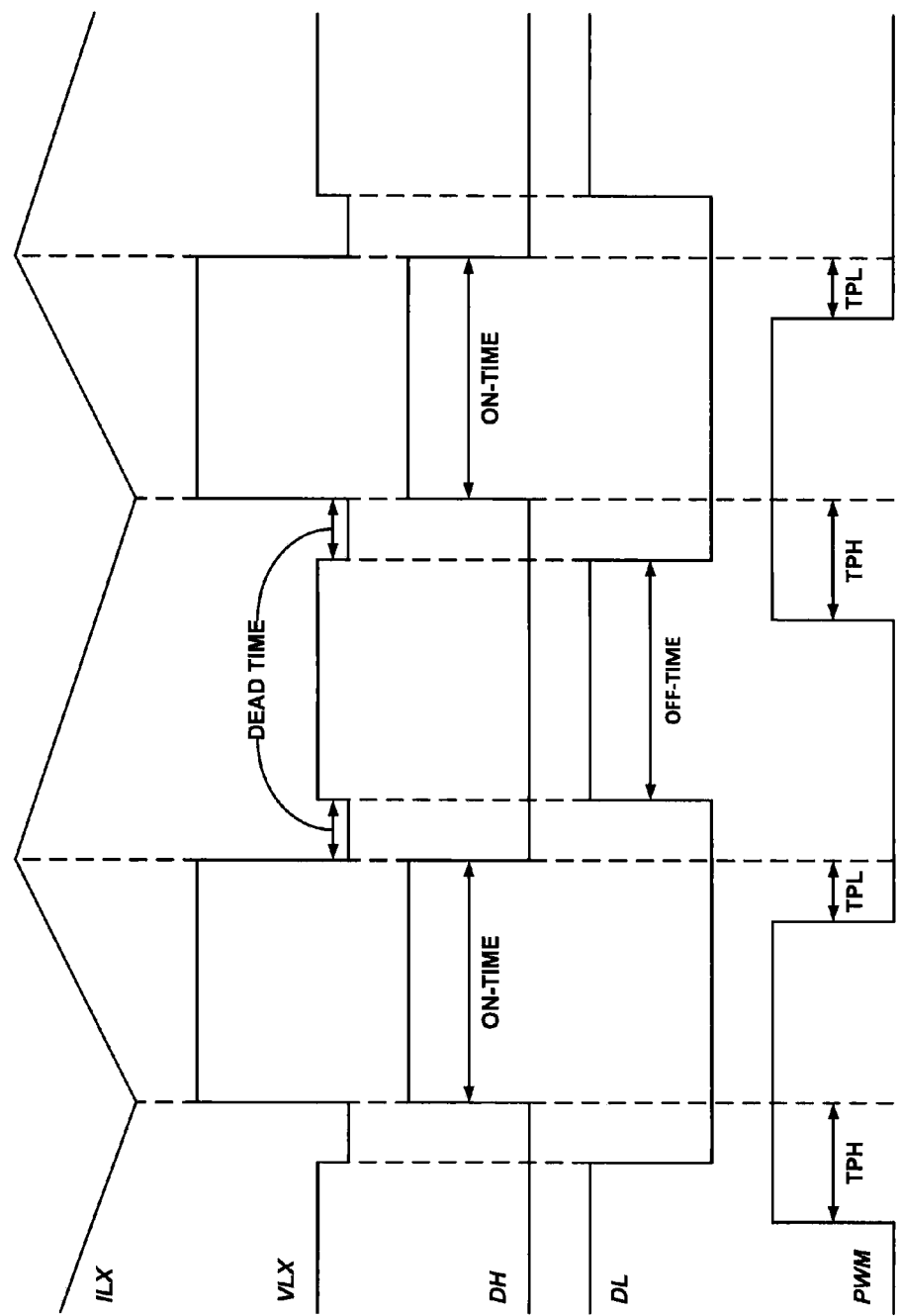
FIG. 2 depicts voltage and current waveforms of the SMPS of FIG. 1.

Referring now to FIG. 2, to prevent cross-conduction in the switching regulator 106, dead times are interposed between an on-time for which the high-side pass element is turned on and an off-time for which the low-side pass element is turned on, as shown. During the dead times, both pass elements are turned off. An inductor connected to a node at which the pass elements are connected in series (called switching node (LX)) ensures continuity of current through the load 104.

Since both pass elements are turned off during dead times, the current through the inductor (the inductor current) flows through a parasitic body diode of either the high-side or the low-side pass element depending on the polarity of the inductor current. In FIG. 1, a positive inductor current ILX flows through a parasitic body diode of the low-side switch while a negative inductor current ILX flows through a parasitic body diode of the high-side switch.

The flow of the inductor current through either parasitic body diode generates two power losses. A first power loss is proportional to a product ($V_{DIODE} \times I_{DIODE}$), where $V_{DIODE}$ is a non-zero voltage drop of a parasitic body diode when the parasitic body diode is forward-biased ($V_{DIODE}$ is nearly 0.7V for a standard silicon p-n junction), and $I_{DIODE}$ is a current flowing through the parasitic body diode. A second power loss is proportional to a diffusion charge ($Q_D$) collected by the forward-biased parasitic body diode due to its non-zero forward transit time. This charge must be removed before the parasitic body diode can be reverse-biased and is upper-limited by a reverse recovery charge ($Q_{RR}$) of the parasitic body diode. Both these power losses are proportional to an amount of time during which the parasitic body diode is forward biased. Therefore, the power conversion efficiency of the SMPS 100 can be improved by reducing dead time duration.

Methods for reducing dead times may include varying turn-on and turn-off delays of the pass elements based on a feedback signal proportional to the dead times. While these methods can provide optimal or minimum dead times, these methods do not reduce a propagation delay of the switching regulator (shown as TPH and TPL in FIG. 2). The propagation delay is defined as a delay between a time instant when a control logic issues a given control signal and a time instant when the control signal is actuated by a power stage (i.e., when the switching node LX is in fact switched according to the control signal). This delay causes suboptimal performance of the SMPS in response to transient external excitations (e.g., load current steps, input or output voltage variations, and noise), which may result in marginal stability or even instability, depending on the duration of the delay and the external conditions. This is especially important in SMPSs used in notebooks or servers, which tend to have increasingly demanding transient requirements.

The present disclosure reduces dead times of a switching regulator and at the same time minimizes its propagation delay. The present disclosure advances turn-on of one pass element (e.g., the high-side pass element) or delays turn-off of the other pass element (e.g., the low-side pass element). This allows dead times to be regulated to a predefined target value and at the same time maintains a minimum propagation delay. A proposed implementation also offers flexibility to trade power efficiency for transient performance by deciding which parameter (dead time or propagation delay) has a greater priority. The proposed implementation offers an additional advantage of maintaining the dead time independent of a switching frequency of the switching regulator.

More specifically, the present disclosure relates to switching regulators controlling two or more switches, where a dead time is interposed between turn-off of one switch and turn-on of another switch to prevent both switches from being turned on at the same time (referred to as crossconduction). The systems and methods of the present disclosure provide adaptive control of the dead times of a switching regulator to improve power efficiency. The dead times are controlled by advancing the turn-on of one pass element or, if necessary, by delaying the turn-off of the other pass element. This ensures that dead time regulation is achieved with minimum allowable propagation delay.

At startup, when regulation is not yet reached, turn-on and turn-off delays of both pass elements are determined by a native propagation delay of the respective drivers, which could be increased by using feedback signals received from the drivers to grossly prevent cross-conduction. The proposed systems and methods first try to reduce the propagation delay by advancing the turn-on of one pass element. This is accomplished by generating a signal that attempts to override a turn-on signal received from the corresponding driver, which allows the effective propagation delay of the driver to decrease. This mode of operation is called an "advance" mode of operation, which allows adaptive dead time control by reducing (instead of increasing) the overall propagation delay.

At the end of the advance mode, the switching regulator has minimum propagation delay but the dead time might be greater than desired (but smaller than the native dead time). This condition of minimum propagation delay is ideal for transient performance and stability of the switching regulator but may not be satisfactory from a power conversion efficiency viewpoint. For this reason, the controller can continue to operate in the advance mode even if a measured dead time is greater than a predetermined target dead time. In other words, the controller can be set to give the propagation delay a higher priority than the dead time. This feature allows a trade-off between power efficiency and transient performance.

After the advance mode of operation is complete, and if the measured dead time is still greater than desired, the controller begins a "delay" mode of operation, where the controller fixes a turn-on delay of one pass element at nearly zero and starts increasing a turn-off delay of the other pass element until the dead time regulation is achieved. In the delay mode of operation, the dead time is reduced at the expenses of propagation delay.

Figure 3:
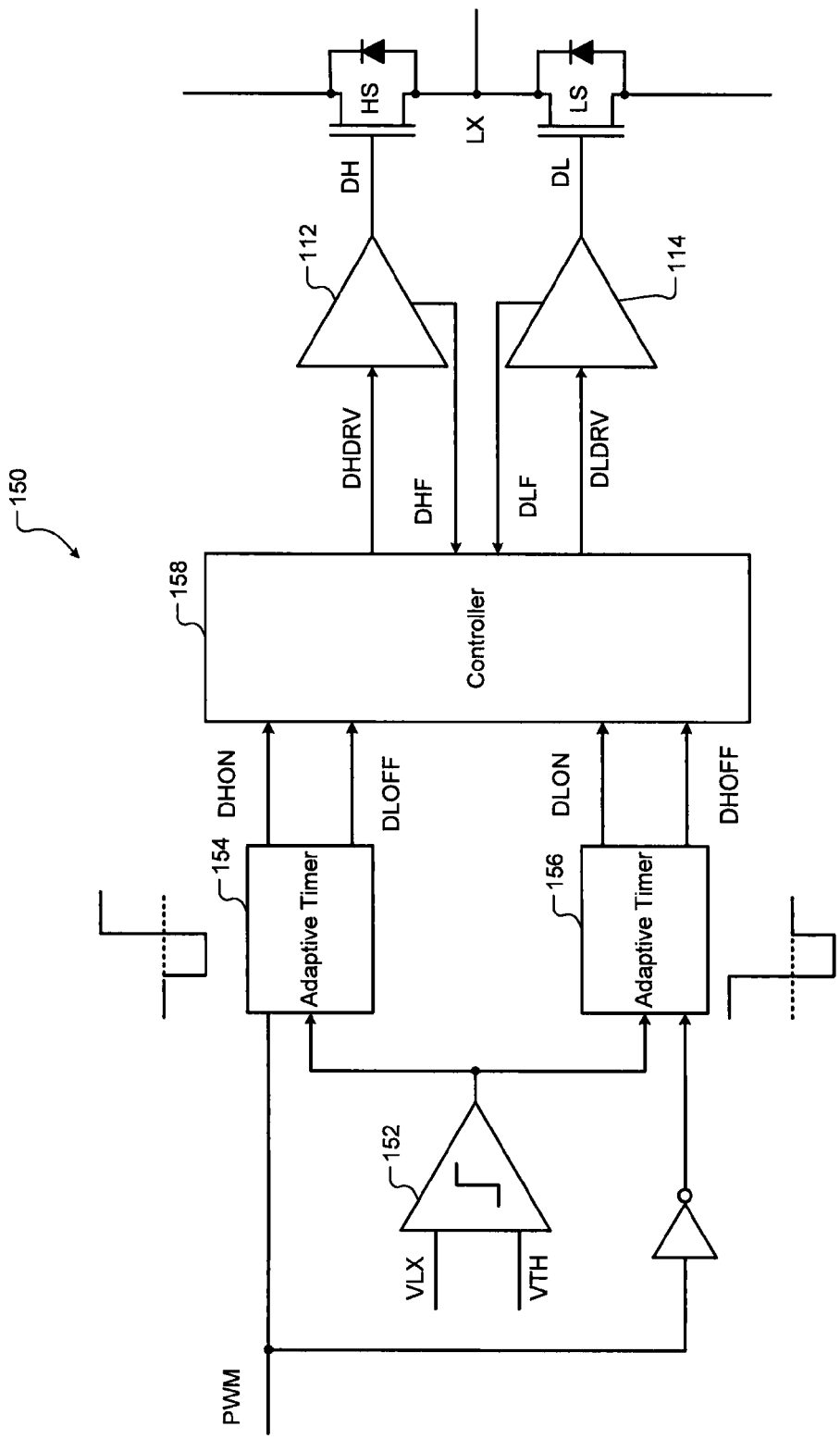
FIG. 3 is a functional block diagram of a switching regulator comprising a dead time detector and a plurality of adaptive timers used to regulate dead time and propagation delay of the switching regulator.

Referring now to FIG. 3, a switching regulator 150 according to the present disclosure is shown. The switching regulator 150 comprises a dead time detector 152, adaptive timers 154 and 156, a controller 158, the high-side and low-side drivers 112 and 114, and the high-side and low-side switches. The dead time detector 152 includes a fast and symmetric comparator that accurately measures the duration of each dead time and outputs a signal proportional to the dead time. Each of the adaptive timers 154 and 156 generates turn-on and turn-off signals based on the information received from the dead time detector 152. The controller 158 processes the turn-on and turn-off signals to generate high-side and low-side drive signals (DHDRV and DLDRV).

The dead time detector 152 is explained in detail with reference to FIGS. 4A-4D. The adaptive timers 154 and 156 are explained in detail with reference to FIGS. 5 and 6. The controller 158 is explained in detail with reference to FIG. 7.

The dead time detector 152 and the adaptive timers 154 and 156 use a "current-mode" approach, which allows improved regulation accuracy compared to a "voltage-mode" approach. A dead time detector using the voltage-mode approach generates a logic (voltage) signal that is normally low and becomes high only during dead times. Generating such logic signal requires a very high voltage slew rate at the output of the dead time detector because a voltage swing of a few volts (e.g., 1.8V or 3.3V or 5V) must be covered in a very short amount of time (typically less than 1 ns). Moreover, the dead time detector must be highly symmetric because differences between rising and falling edges may corrupt the information related to dead time duration. Finally, the dead time detector must be very fast to allow detection of dead times on the order of a few nanoseconds. All these requirements cannot be met in a dead time detector that uses the voltage-mode approach to generate a voltage output signal. The dead time detector using the voltage-mode approach is inaccurate due to high propagation delay and asymmetric behavior (different rise and fall times).

The proposed current-mode approach is based on using a current (instead of a voltage) signal that includes the information of dead time duration. The dead time detector 152 uses the current-mode approach and includes a voltage comparator that generates an output current signal IOUT. An output node of the dead time detector 152 is fed with a given amount of positive current only during dead times, the output current being negative in absence of a dead time. This simplifies the design of the dead time detector 152 because the required current slew rate can be generated from very small voltage slew rate using a proper transconductance stage. The current-mode approach allows the propagation delay to be greatly reduced compared to the voltage-mode approach, which normally makes the dead time detector 152 sufficiently symmetric with no additional design effort.

Accordingly, the dead time detector 152 includes a voltage comparator that generates an output current signal. The dead time detector 152 compares a voltage VLX of the switching node LX with a fixed voltage threshold VTH to detect when a dead time occurs. When a dead time occurs, the dead time detector 152 generates a positive pulse of current at the output node. The positive and negative current values at the output node of the dead time detector 152 may be predefined. The positive pulse of current has a duration proportional to a duration of the dead time.

The voltage comparator is designed to have very fast response to an input step signal (typically less than 1 nanosecond) and a high degree of symmetry (e.g., difference between rising and falling propagation delays is on the order of a few hundreds of picoseconds). This is a significant improvement over the voltage-mode approach, where the above times are three to four times greater.

Figure 4A:
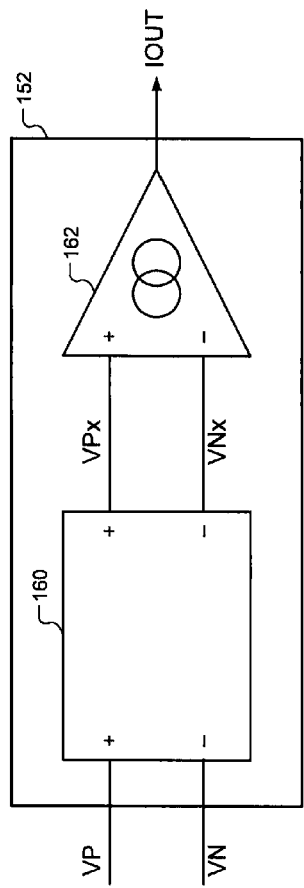
FIG. 4A is a functional block diagram of the dead time detector used in the switching regulator of FIG. 3.
Figure 4D:
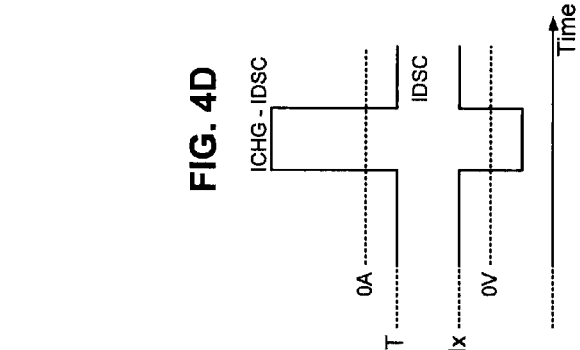
FIG. 4D depicts dynamic characteristics of the transconductance amplifier of FIG. 4B.
Figure 4C:
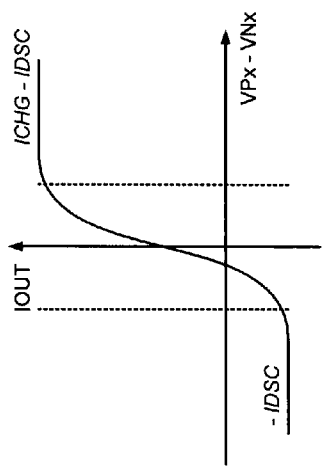
FIG. 4C depicts static I-V characteristics of the transconductance amplifier of FIG. 4B.
Figure 4B:
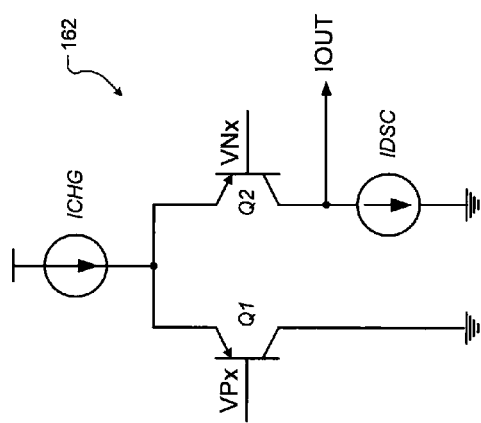
FIG. 4B is a schematic of a transconductance amplifier used in the dead time detector of FIG. 4A.

Referring now to FIGS. 4A-4D, the dead time detector 152 is shown. In FIG. 4A, the dead time detector 152 comprises a voltage amplifier 160 and a transconductance amplifier 162. The voltage amplifier 160 includes a low-gain voltage amplifier. VP and VN denote voltages at positive and negative inputs of the voltage amplifier 160 and are equal to VTH and VLX respectively. The transconductance amplifier 162 includes a current conveyor transconductance amplifier. In FIG. 4B, a simplified schematic of the transconductance amplifier 162 is shown. In FIG. 4C, static I-V characteristics of the transconductance amplifier 162 are shown. In FIG. 4D, dynamic characteristics of the transconductance amplifier 162 are shown.

The transconductance amplifier 162 allows a bias current ICHG to be completely switched to the output node if enough differential voltage is provided at its inputs. This differential voltage is provided by the voltage amplifier 160 whose gain can be tuned to optimize the speed of the dead time detector 152. A negative current equal to (-IDSC) is always present at the output node of the transconductance amplifier. A ratio of ICHG to IDSC may be selected to regulate a desired dead time as follows.

In FIG. 3, the output of the dead time detector 152 is fed to the adaptive timers 154 and 156. Each of the adaptive timers 154 and 156 controls the dead time during only one VLX transition, either low-to-high or high-to-low, respectively. One of the adaptive timers 154 and 156 (e.g., the adaptive timer 154) is enabled when a PWM pulse is logic high while the other adaptive timer (e.g., the adaptive timer 156) is enabled when the PWM pulse is logic low.

Figure 5:
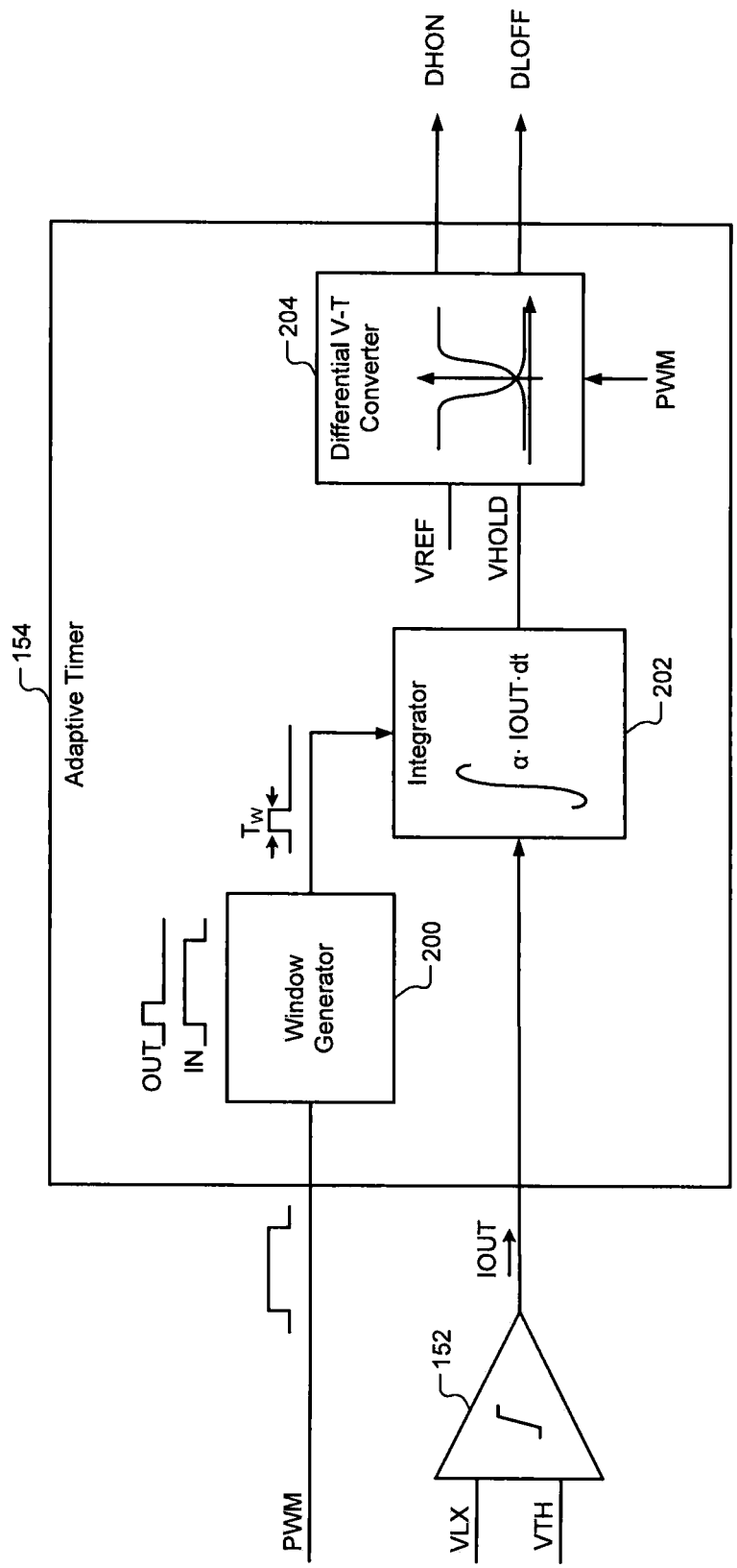
FIG. 5 is a functional block diagram of an adaptive timer used in the switching regulator of FIG. 3.
Figure 6:
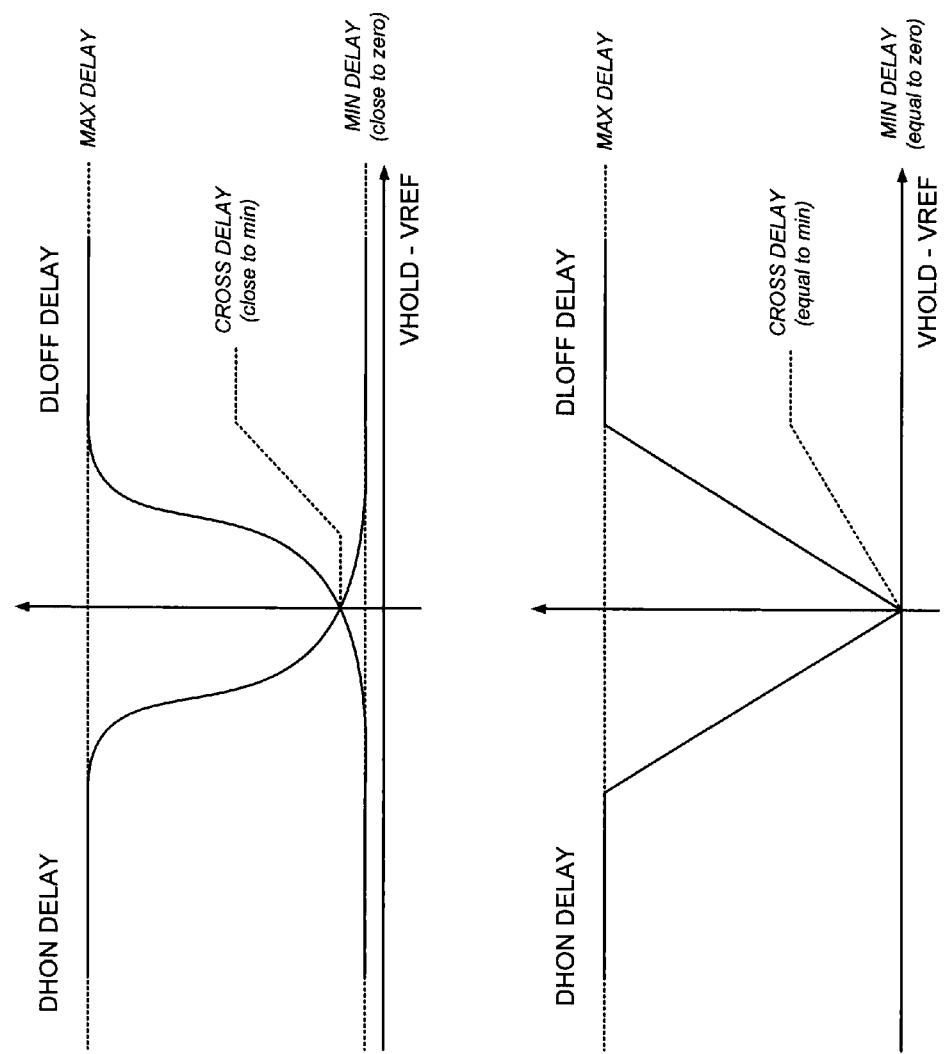
FIG. 6 depicts characteristics of the adaptive timer of FIG. 5.

Referring now to FIG. 5, the adaptive timer 154 is shown. The operation of the adaptive timer 156 is similar to the operation of the adaptive timer 154 and is therefore not described to avoid repetition. For example, the adaptive timer 154 is used for low-to-high VLX transition. The adaptive timer 154 comprises a window generator 200, an integrator 202, and a differential voltage-to-time converter 204.

The window generator 200 includes a timer that is triggered in this example by a rising edge of a PWM pulse. The window generator 200 generates a pulse or a time window having a duration or a pulse width $T_W$ at the rising edge of the PWM pulse. The duration $T_W$ of the time window is less than the duration or pulse width of the PWM pulse.

An integrator 202 receives the current signal IOUT generated by the dead time detector 152 and the pulse (time window $T_W$) generated by the window generator 200. The integrator performs a weighted time-integral of the current signal IOUT over the time window $T_W$ and outputs a voltage VHOLD according to the following equation:

$$\text{VHOLD}(t) = \text{VHOLD}(t0) + \int_{t}^{t+TW} \alpha \cdot \text{IOUT}(t) \cdot dt$$

where t0 is the time instant where integration begins (e.g., the rising edge of the PWM signal), and α is a weighting factor. Integration occurs only during the time window $[t_0, t_0 + T_W]$.

The current signal IOUT has positive amplitude equal to (ICHG-IDSC) only during a dead times and has negative amplitude equal to (-IDSC) at other times. Therefore, as soon as the PWM pulse goes logic high (i.e., at the beginning of the time window $T_W$ or time instant $t_0$), the instantaneous voltage VHOLD starts falling because partial integration result is negative. If a dead time occurs during the time window $T_W$, a positive current pulse of amplitude (ICHG-IDSC) is generated by the dead time detector 152, and the instantaneous voltage VHOLD starts rising. In steady-state operation, the integral value of the voltage VHOLD over the entire time window $T_W$ does not vary because it is regulated by the system and the following equation must be satisfied:

$$I_{DSC} \times T_W = I_{CHG} \times T_{DEAD} \qquad (1)$$

This is the basic design equation to determine the regulated dead time as a function of the time window $T_W$ and the charge and discharge currents. That is, a desired dead time can be achieved by selecting $T_W$, $I_{CHG}$, and $I_{DSC}$. Equation (1) shows that the regulated dead time is independent of the switching frequency of the switching regulator.

The average voltage VHOLD is defined by the control loop of the adaptive timer 154. The average voltage VHOLD derives from integration of the current signal IOUT output by the dead time detector 152 as described above. The average voltage VHOLD also determines the turn-on and turn-off timing of the high-side and low-side switches, which in turn defines the regulated dead time.

The average voltage VHOLD is compared with a reference voltage VREF by the differential voltage-to-time converter 202. The differential voltage-to-time converter 202 generates the actual turn-on and turn-off signals DHON and DLOFF based on the differential voltage (VHOLD−VREF). Therefore, when the control loop of the adaptive timer 154 is in regulation, the differential voltage (VHOLD−VREF) is continuously adjusted to regulate the desired dead time.

Referring now to FIG. 6A, the operation of the adaptive timer 154 is explained in detail. The system starts with the voltage VHOLD=0V. Therefore, the turn-off signal DLOFF goes high immediately after PWM goes high while the turn-on signal DHON goes high after a very long delay. In this condition, the dead time may be greater than desired. Therefore, the integral of the current signal IOUT received from the dead time detector 152 over the entire period $T_W$ is positive and causes the voltage VHOLD to increase.

As soon as the voltage VHOLD increases, the delay of the turn-on signal DHON decreases. Similarly, the delay of the turn-off signal DLOFF increases. When the voltage VHOLD is equal to the reference voltage VREF, the delays of the turn-on signal DHON and the turn-off signal DLOFF are equal (referred to as CROSS DELAY in FIG. 6A). The differential voltage-to-current converter 204 can be designed to have the delays of the turn-on signal DHON and the turn-off signal DLOFF close to the minimum value when the voltage VHOLD is equal to the reference voltage VREF. Therefore, the delay of the turn-off signal DLOFF can be assumed to remain almost constant when the voltage VHOLD increases to the reference voltage VREF. When the voltage VHOLD increases above the reference voltage VREF, a similar behavior can be observed but the roles of DHON and DLOFF are reversed. A graphical representation of the characteristics of a practical version of the differential voltage-to-time converter 204 is shown in FIG. 6A. Characteristics of an ideal version of the differential voltage-to-time converter 204 are shown in FIG. 6B for comparison purposes. An ideal version of the differential voltage-to-time converter 204 has zero minimum delay and zero delay when VHOLD equals VREF. Moreover, the transition from minimum to maximum delay is linear. Different circuit implementations of the differential voltage-to-time converter 204 can be realized with the goal of approximating the characteristics of the ideal version of the differential voltage-to-time converter 204. Design trade-offs are driven by overall system accuracy, linearity, consumption, and area occupancy.

In FIG. 3, each of the adaptive timers 154 and 156 outputs two signals, a turn-on signal and a turn-off signal. The adaptive timer 154 outputs a turn-on signal DHON for the high-side switch and a turn-off signal DLOFF for the low-side switch. The adaptive timer 156 outputs a turn-on signal DLON for the low-side switch and a turn-off signal DHOFF for the high-side switch. These signals from the adaptive timers 154 and 156 are output to the controller 158. The controller 158 generates actual gate drive signals (DHDRV and DLDRV) for the high-side and low-side pass elements.

The controller 158 also receives feedback signals (DHF and DLF) from the high-side and low-side drivers 112 and 114 as inputs. These signals (DHF and DLF) are level-shifted versions of the pass element gate signals DH and DL. These signals (DHF and DLF) are used to prevent cross-conduction in the pass elements. However, these signals (DHF and DLF) only allow a coarse control of dead times, which is normally in the 10-20 ns range (or even more depending on propagation delays of the high-side and low-side drivers 112 and 114). The adaptive dead time control proposed by the present disclosure is supposed to override the feedback signals DHF and DLF to further reduce the dead time duration and improve power efficiency of the switching regulator. This is accomplished by the controller 158 as follows.

Figure 7:
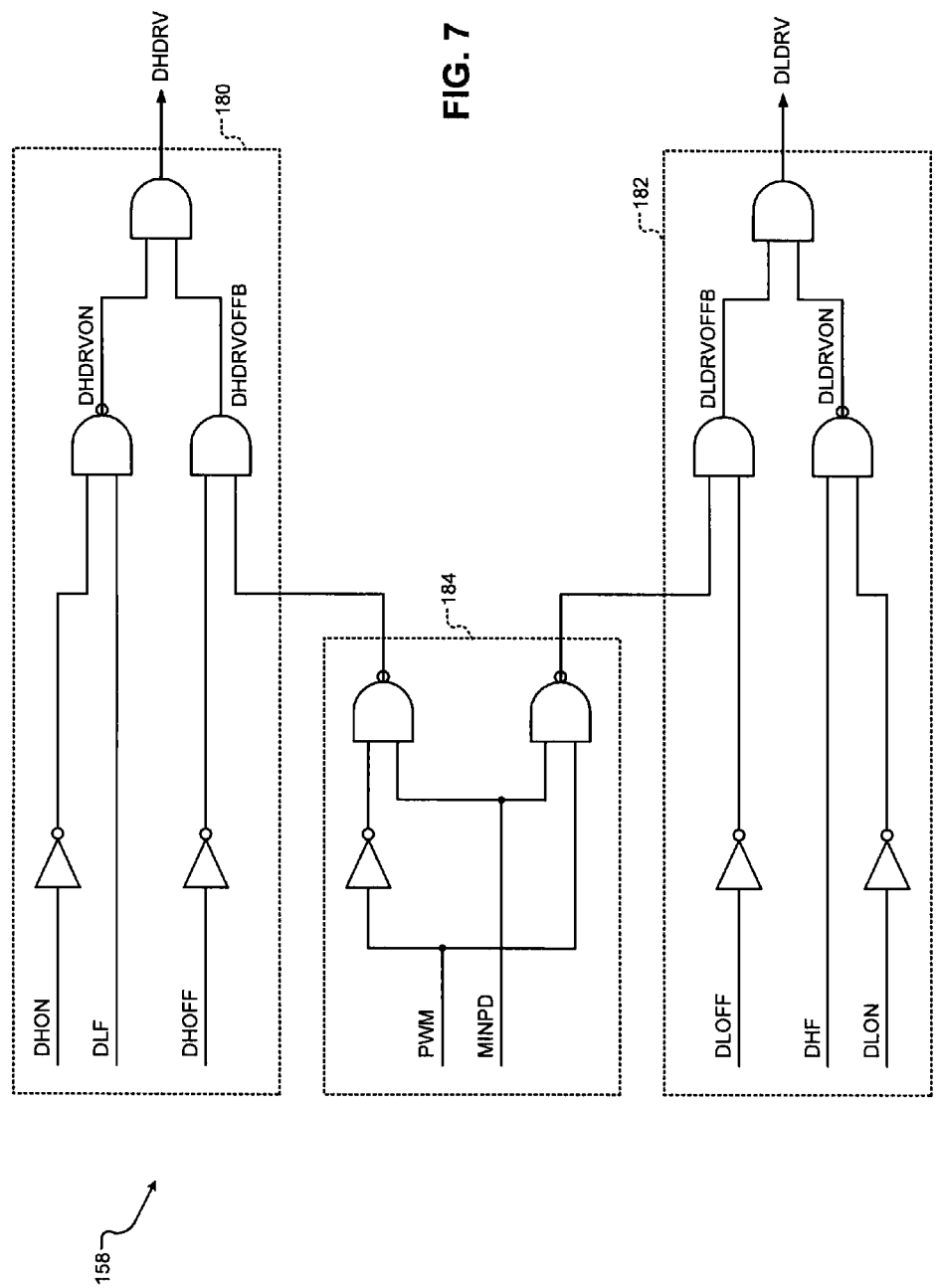
FIG. 7 is a schematic of a controller used in the switching regulator of FIG. 3.

Referring now to FIG. 7, the controller 158 is shown in detail. The controller 158 comprises a high-side control logic 180, a low-side control logic 182, and a propagation delay control logic 184. In the high-side control logic 180, assuming that the adaptive dead time control is out of regulation (DHON is low), a high-side gate drive signal DHDRV cannot be forced high if the feedback signal DLF is high (indicating that the low-side pass element is still turned on), thus preventing cross-conduction. When the adaptive dead time control loop approaches regulation, the delay of the turn-on signal DHON going high relative to the rising edge of the PWM pulse becomes smaller as the voltage VHOLD continues to increase. At a certain level of the voltage VHOLD, the turn-on signal DHON becomes high before DLF goes low, thus allowing turn-on of the high-side pass element and overriding the feedback signal DLF.

The propagation delay control logic 184 may prevent the system from entering the delay mode. When a signal MINPD to minimize propagation delay is low, the propagation delay control logic 184 generates turn-off signals DHDRVOFFB and DLDRVOFFB. The turn-off signals DHDRVOFFB and DLDRVOFFB are controlled by the adaptive timers 154 and 156 through signals DHOFF and DLOFF in the high-side control logic 180 and the low-side control logic 182, respectively. Pass element turn-off can thus be delayed to ensure dead time regulation.

On the other hand, when the signal MINPD is high, the pass elements are turned off as soon as the PWM pulse changes logic level, (e.g., the high-side pass element is turned off as soon as the PWM pulse goes low). As mentioned above, this may prevent dead time regulation but may ensure that the propagation delay is minimum, which optimizes transient response and stability of the switching regulator.

The above principle can be easily extended to other signals shown in FIG. 7 that are related to turn-on and turn-off of the high-side and low-side pass elements. The ability of the control system to work in either the advance mode or the delay mode as described before ensures dead time regulation under any operating condition because delays can be adjusted without any limit. The only practical limit is the increase in the propagation delay when the system needs to work in the delay mode due to external conditions.

Figure 8:
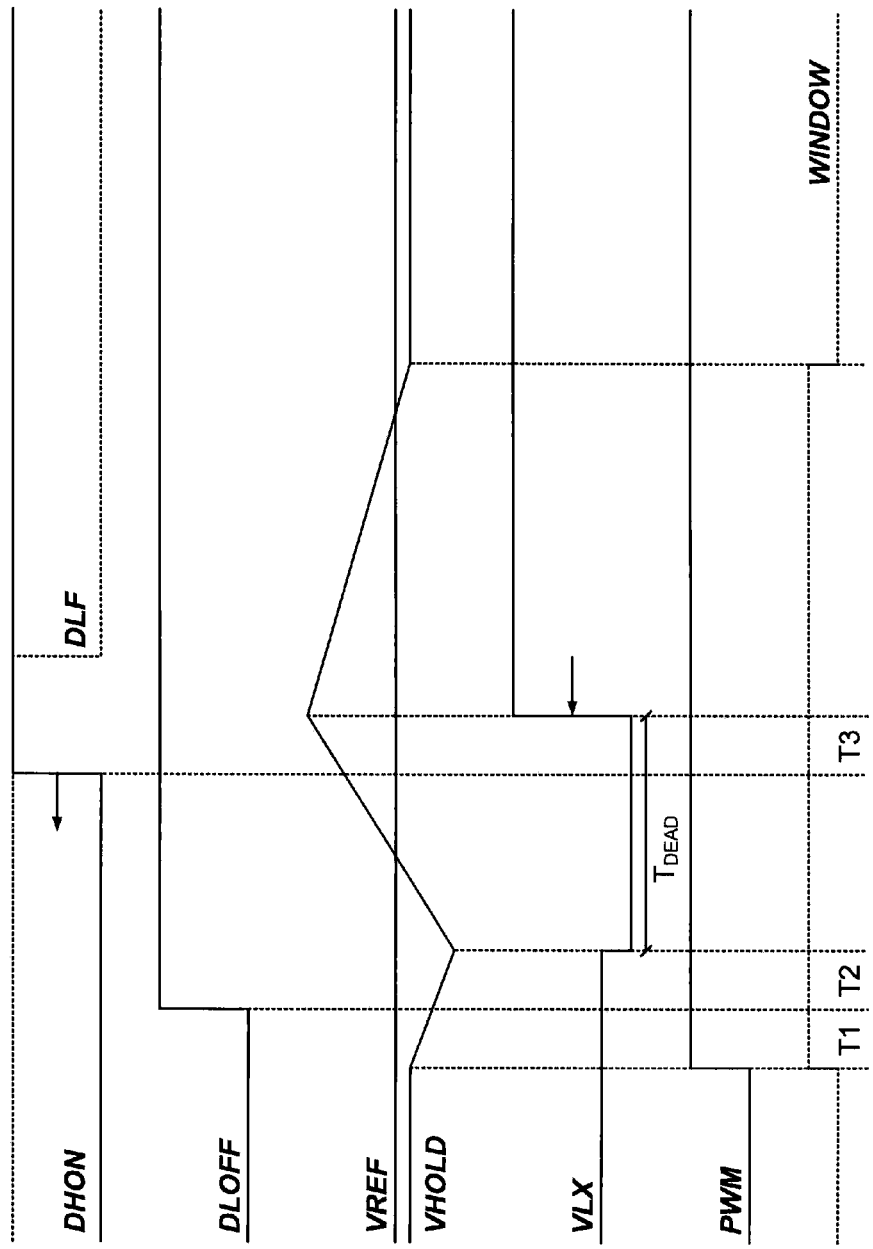
FIG. 8 depicts waveforms of adaptive dead time control when the switching regulator of FIG. 3 operates in an advance mode.
Figure 9:
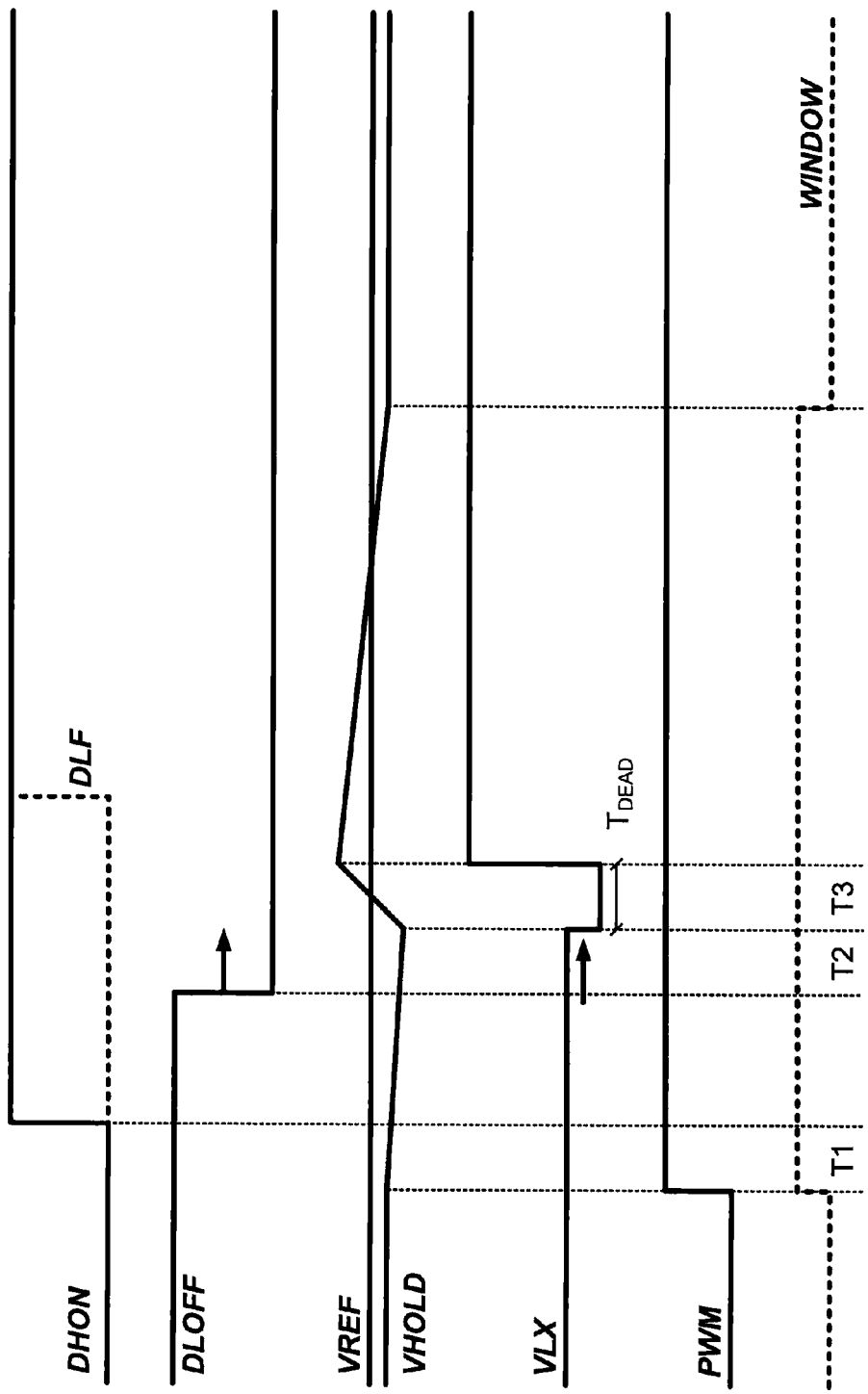
FIG. 9 depicts waveforms of adaptive dead time control when the switching regulator of FIG. 3 operates in a delay mode.

FIGS. 8 and 9 show waveforms of the adaptive dead time control related to the low-to-high VLX transition in the advance mode and the delay mode, respectively. In FIG. 8, by advancing the turn-on signal DHON as indicated by a left arrow, the dead time TDEAD can be reduced as indicated by a left arrow. In FIG. 9, by delaying the turn-off signal DLOFF as indicated by a right arrow, the dead time TDEAD can be reduced as indicated by a right arrow.

Figure 10:
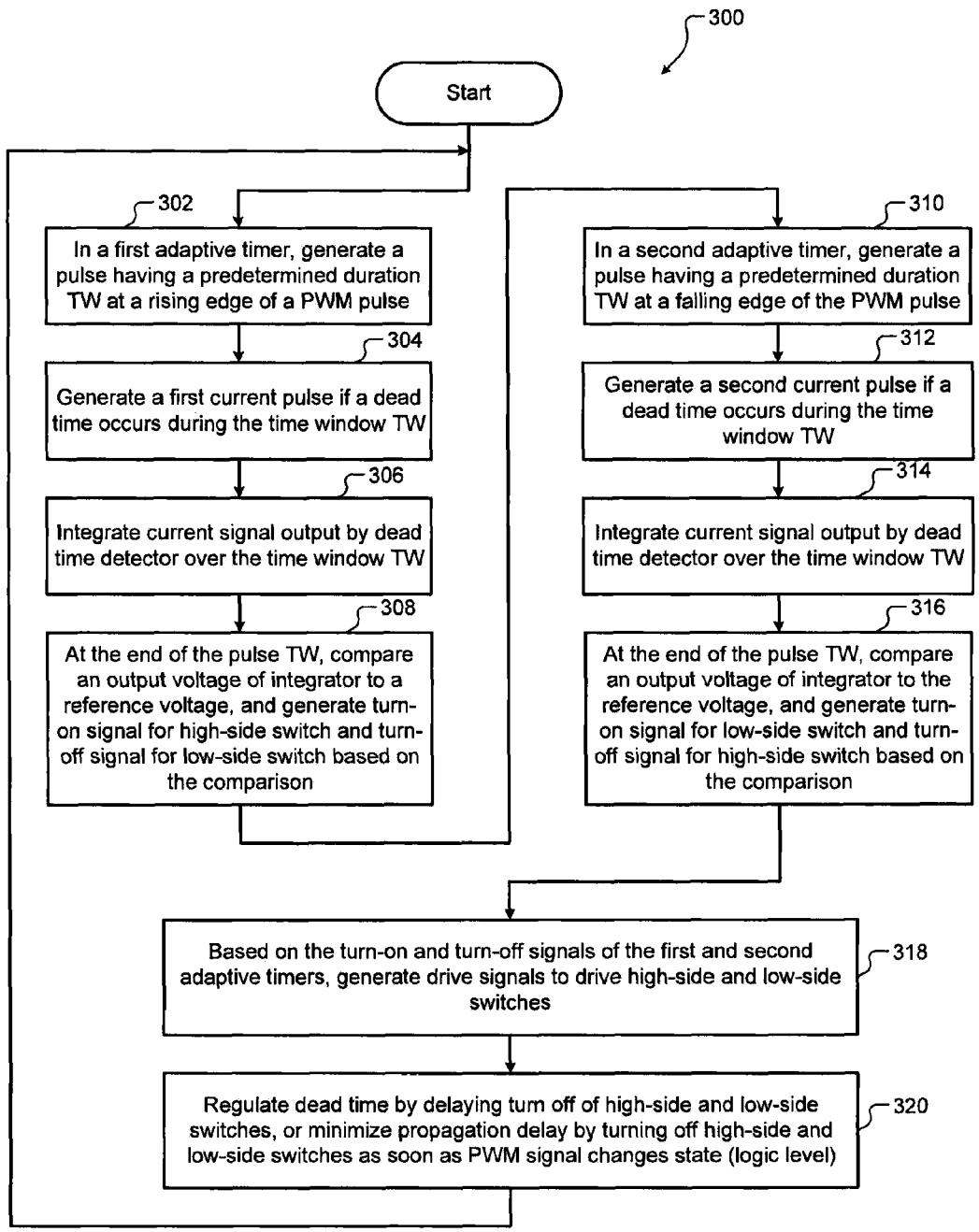
FIG. 10 is a flowchart of a method for regulating dead time and propagation delay of a switching regulator.

Referring now to FIG. 10, a method 300 for regulating dead time and propagation delay of a switching regulator is shown. At 302, in a first adaptive timer, a pulse having a predetermined duration $T_W$ is generated at a rising edge of a PWM pulse. At 304, a first current pulse may be generated by a dead time detector when a dead time occurs during the time window $T_W$. At 306, a current signal output by the dead time detector is integrated over the time window $T_W$. At 308, at the end of the pulse $T_W$, an output voltage of the integrator is compared to a reference voltage, and a turn-on signal for a high-side switch and a turn-off signal for a low-side switch are generated based on the comparison. At 310, in a second adaptive timer, a pulse having a predetermined duration $T_W$ is generated at a falling edge of the PWM pulse. At 312, a second current pulse may be generated by a dead time detector when a dead time occurs during the time window $T_W$. At 314, a current signal output by the dead time detector is integrated over the time window $T_W$. At 316, at the end of the pulse $T_W$, an output voltage of the integrator is compared to the reference voltage, and a turn-on signal for the low-side switch and a turn-off signal for the high-side switch are generated based on the comparison. At 318, drive signals to drive the high-side and low-side switches are generated based on the turn-on and turn-off signals generated by the first and second adaptive timers. At 320, the dead time is regulated by advancing the turn-on of the high-side and low-side switches. Propagation delay is minimized by turning off the high-side and low-side switches as soon as the PWM pulse changes state (logic level).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system comprising:
    a dead time detector that detects when a dead time occurs and that generates an output signal based on a duration of the dead time, wherein the dead time is a period of time during which a high-side switch and a low-side switch of a switching regulator are turned off;
    a first circuit that generates a first turn-on signal to turn on the high-side switch and a first turn-off signal to turn off the low-side switch based on the output signal in response to a first edge of a pulse width modulated pulse;
    a second circuit that generates a second turn-on signal to turn on the low-side switch and a second turn-off signal to turn off the high-side switch based on the output signal in response to a second edge of the pulse width modulated pulse; and
    a controller that generates a first gate drive signal to drive the high-side switch and a second gate drive signal to drive the low-side switch based on the first and second turn-on and turn-off signals,
    wherein the controller comprises a propagation delay control circuit that controls a propagation delay of the switching regulator by turning off the high-side and low-side switches when the pulse width modulated pulse changes state,
    wherein the propagation delay is defined as a delay between a time when a pulse width modulator issues a pulse width modulated pulse and a time when a switching node between the high-side and low-side switches is in fact switched according to the pulse width modulated pulse; and
    wherein the controller regulates the dead time to a predefined target value while maintaining the propagation delay within a predetermined limit.

2. The system of claim 1 wherein the duration of the dead time is a function of the first and second gate drive signals, and wherein the duration of the dead time is independent of a switching frequency of the switching regulator.

3. The system of claim 1 wherein the first and second circuits control the duration of the dead time by respectively advancing timings of the first and second turn-on signals or by delaying timings of the first and second turn-off signals.

4. The system of claim 1 wherein the dead time detector comprises a comparator that compares a threshold voltage to a voltage at a node where the high-side and low-side switches are connected in series and that generates the output signal including a current pulse based on the comparison.

5. The system of claim 1 further comprising:
    a first driver that drives the high-side switch based on the first gate drive signal and that generates a first feedback signal; and
    a second driver that drives the low-side switch based on the second gate drive signal and that generates a second feedback signal,
    wherein the controller receives the first and second feedback signals to prevent the high-side and low-side switches from turning on concurrently, and
    wherein the controller controls the dead time by overriding the first and second feedback signals.

6. The system of claim 1, wherein the propagation delay is a delay between the first edge of the pulse width modulated pulse and a time when a voltage at a node where the high-side and low-side switches are connected in series changes in response to the first edge of the pulse width modulated pulse.

7. The system of claim 1, wherein the propagation delay is a delay between the second edge of the pulse width modulated pulse and a time when a voltage at a node where the high-side and low-side switches are connected in series changes in response to the second edge of the pulse width modulated pulse.

8. The system of claim 1 wherein the dead time detector comprises:
    a voltage amplifier that generates a differential voltage based on a threshold voltage and a voltage at a node where the high-side and low-side switches are connected in series; and
    a transconductance amplifier that outputs a positive current as the output signal based on the differential voltage when the dead time occurs.

9. The system of claim 8 wherein a gain of the voltage amplifier is set according to a desired speed of the dead time detector.

10. The system of claim 8 wherein the transconductance amplifier outputs a negative current pulse as the output signal in absence of the dead time.

11. The system of claim 1 wherein the first circuit comprises:
a timer that generates a pulse having a predetermined pulse width in response to the first edge of the pulse width modulated pulse;
an integrator that performs a weighted time-integral of the output signal of the dead time detector over a time period equal to the predetermined pulse width and that generates an output voltage; and
a differential voltage-to-time converter that compares a reference voltage to the output voltage of the integrator and that generates the first turn-on and turn-off signals based on the comparison.

12. The system of claim 1 wherein the second circuit comprises:
a timer that generates a pulse having a predetermined pulse width in response to the second edge of the pulse width modulated pulse;
an integrator that performs a weighted time-integral of the output signal of the dead time detector over a time period equal to the predetermined pulse width and that generates an output voltage; and
a differential voltage-to-time converter that compares a reference voltage to the output voltage of the integrator and that generates the second turn-on and turn-off signals based on the comparison.

13. A system comprising:
a dead time detector that detects when a dead time occurs and that generates an output signal based on a duration of the dead time, wherein the dead time is a period of time during which a high-side switch and a low-side switch of a switching regulator are turned off;
a first circuit that generates a first turn-on signal to turn on the high-side switch and a first turn-off signal to turn off the low-side switch based on the output signal in response to a first edge of a pulse width modulated pulse;
a second circuit that generates a second turn-on signal to turn on the low-side switch and a second turn-off signal to turn off the high-side switch based on the output signal in response to a second edge of the pulse width modulated pulse; and
a controller that generates a first gate drive signal to drive the high-side switch and a second gate drive signal to drive the low-side switch based on the first and second turn-on and turn-off signals,
wherein the dead time detector comprises:
a voltage amplifier that generates a differential voltage based on a threshold voltage and a voltage at a node where the high-side and low-side switches are connected in series; and
a transconductance amplifier that outputs a positive current as the output signal based on the differential voltage when the dead time occurs.

14. The system of claim 13 wherein a gain of the voltage amplifier is set according to a desired speed of the dead time detector.

15. The system of claim 13 wherein the transconductance amplifier outputs a negative current pulse as the output signal in absence of the dead time.

16. A system of comprising:
a dead time detector that detects when a dead time occurs and that generates an output signal based on a duration of the dead time, wherein the dead time is a period of time during which a high-side switch and a low-side switch of a switching regulator are turned off;
a first circuit that generates a first turn-on signal to turn on the high-side switch and a first turn-off signal to turn off the low-side switch based on the output signal in response to a first edge of a pulse width modulated pulse;
a second circuit that generates a second turn-on signal to turn on the low-side switch and a second turn-off signal to turn off the high-side switch based on the output signal in response to a second edge of the pulse width modulated pulse; and
a controller that generates a first gate drive signal to drive the high-side switch and a second gate drive signal to drive the low-side switch based on the first and second turn-on and turn-off signals,
wherein the first circuit comprises:
a timer that generates a pulse having a predetermined pulse width in response to the first edge of the pulse width modulated pulse;
an integrator that performs a weighted time-integral of the output signal of the dead time detector over a time period equal to the predetermined pulse width and that generates an output voltage; and
a differential voltage-to-time converter that compares a reference voltage to the output voltage of the integrator and that generates the first turn-on and turn-off signals based on the comparison.

17. A system comprises:
a dead time detector that detects when a dead time occurs and that generates an output signal based on a duration of the dead time, wherein the dead time is a period of time during which a high-side switch and a low-side switch of a switching regulator are turned off;
a first circuit that generates a first turn-on signal to turn on the high-side switch and a first turn-off signal to turn off the low-side switch based on the output signal in response to a first edge of a pulse width modulated pulse;
a second circuit that generates a second turn-on signal to turn on the low-side switch and a second turn-off signal to turn off the high-side switch based on the output signal in response to a second edge of the pulse width modulated pulse; and
a controller that generates a first gate drive signal to drive the high-side switch and a second gate drive signal to drive the low-side switch based on the first and second turn-on and turn-off signals,
wherein the second circuit comprises:
a timer that generates a pulse having a predetermined pulse width in response to the second edge of the pulse width modulated pulse;
an integrator that performs a weighted time-integral of the output signal of the dead time detector over a time period equal to the predetermined pulse width and that generates an output voltage; and
a differential voltage-to-time converter that compares a reference voltage to the output voltage of the integrator and that generates the second turn-on and turn-off signals based on the comparison.

18. A method comprising:
detecting when a dead time occurs, wherein the dead time is a period of time during which a high-side switch and a low-side switch of a switching regulator are turned off;
generating an output signal based on a duration of the dead time;

generating a first turn-on signal to turn on the high-side switch and a first turn-off signal to turn off the low-side switch based on the output signal in response to a first edge of a pulse width modulated pulse;

generating a second turn-on signal to turn on the low-side switch and a second turn-off signal to turn off the high-side switch based on the output signal in response to a second edge of the pulse width modulated pulse;

generating a first gate drive signal to drive the high-side switch and a second gate drive signal to drive the low-side switch based on the first and second turn-on and turn-off signals;

controlling a propagation delay of the switching regulator by turning off the high-side and low-side switches when the pulse width modulated pulse changes state, wherein the propagation delay is defined as a delay between a time when a pulse width modulator issues a pulse width modulated pulse and a time when a switching node between the high-side and low-side switches is in fact switched according to the pulse width modulated pulse; and regulating the dead time to a predefined target value while maintaining the propagation delay within a predetermined limit.

19. The method of claim 18 wherein the duration of the dead time is a function of the first and second gate drive signals, and wherein the duration of the dead time is independent of a switching frequency of the switching regulator.

20. The method of claim 18 further comprising controlling the duration of the dead time by advancing timings of the first and second turn-on signals or by delaying timings of the first and second turn-off signals.

21. The method of claim 18 further comprising:
comparing a threshold voltage to a voltage at a node where the high-side and low-side switches are connected in series; and
generating the output signal including a current pulse based on the comparison.

22. The method of claim 18 further comprising:
generating a differential voltage based on a threshold voltage and a voltage at a node where the high-side and low-side switches are connected in series; and
outputting current as the output signal based on the differential voltage when the dead time occurs.

23. The method of claim 18 further comprising:
generating a pulse having a predetermined pulse width in response to the first edge of the pulse width modulated pulse;
integrating the output signal over a time period equal to the predetermined pulse width and generating an output voltage;
comparing a reference voltage to the output voltage of the integrator; and
generating the first turn-on and turn-off signals based on the comparison.

24. The method of claim 18 further comprising:
generating a pulse having a predetermined pulse width in response to the second edge of the pulse width modulated pulse;
integrating the output signal over a time period equal to the predetermined pulse width and generating an output voltage;
comparing a reference voltage to the output voltage of the integrator; and
generating the second turn-on and turn-off signals based on the comparison.

25. The method of claim 18 further comprising:
driving the high-side switch based on the first gate drive signal;
driving the low-side switch based on the second gate drive signal;
generating first and second feedback signals to prevent the high-side and low-side switches from turning on concurrently; and
controlling the dead time by overriding the first and second feedback signals.

* * * * *

UNITED STATES PATENT AND TRADEMARK OFFICE
CERTIFICATE OF CORRECTION

PATENT NO. : 9,577,525 B2
APPLICATION NO. : 14/474956
DATED : February 21, 2017
INVENTOR(S) : Tonio G. Biondi et al.

Page 1 of 1

It is certified that error appears in the above-identified patent and that said Letters Patent is hereby corrected as shown below:

In the Specification

| | |
|---|---|
| Column 4, Line 28 | After "of" delete "¶" |
| Column 4, Line 31 | After "of" delete "¶" |
| Column 8, Line 51 | Delete "a" and insert -- $\alpha$ -- |
| Column 9, Line 16 | Delete "202" and insert -- 204 -- |
| Column 9, Line 16 | Delete "202" and insert -- 204 -- |
| Column 9, Line 22 | Delete "6A" and insert -- 6 -- |
| Column 9, Line 36 | Delete "6A" and insert -- 6 -- |
| Column 9, Line 37 | Delete "voltage-to-current" and insert -- voltage-to-time -- |
| Column 9, Line 48 | Delete "6A" and insert -- 6 -- |
| Column 9, Line 50 | Delete "6B" and insert -- 6 -- |

Signed and Sealed this
Thirteenth Day of February, 2018

Andrei Iancu
*Director of the United States Patent and Trademark Office*